United States Patent [19]

Ono

[11] 4,382,388
[45] May 10, 1983

[54] DYNAMOMETER ROAD SIMULATING METHOD AND SYSTEM

[75] Inventor: Masamichi Ono, Yokohama, Japan

[73] Assignee: Kabushiki Kaisha Ono Sokki, Japan

[21] Appl. No.: 197,201

[22] Filed: Oct. 15, 1980

[30] Foreign Application Priority Data

Oct. 31, 1979 [JP] Japan .............................. 54-141636
Oct. 31, 1979 [JP] Japan .............................. 54-141637

[51] Int. Cl.³ ........................ G01L 3/22; G01M 15/00
[52] U.S. Cl. .................................. 73/861.18; 73/117
[58] Field of Search ........................... 73/117, 862.18

[56] References Cited

U.S. PATENT DOCUMENTS

| | | | |
|---|---|---|---|
| 3,926,043 | 12/1975 | Marshall et al. | 73/117 |
| 4,186,593 | 2/1980 | Watanabe | 73/117 |
| 4,257,261 | 3/1981 | Ono et al. | 73/862.18 |

Primary Examiner—Charles A. Ruehl

Attorney, Agent, or Firm—McGlew and Tuttle

[57] ABSTRACT

A method for operating a test machine under a reproduced road load by using a dynamometer having its rotary portion coupled to the test machine comprises using a device for providing the same moment of inertia for the dynamometer rotary portion as that of a test machine. Speed values are stored in relation to corresponding times at which the test machine runs at the respective speed values while the test machine is coasting. The speed of rotation of the dynamometer rotary portion is controlled to meet the stored speed values at the corresponding times. During the speed control operation, load values are stored in relation to corresponding speeds at which the respective load values appear on the dynamometer rotary portion. The load produced by the dynamometer is controlled to meet the stored load values according to the speed of running of the test machine.

2 Claims, 7 Drawing Figures

DYNAMOMETER ROAD SIMULATING METHOD AND SYSTEM

BACKGROUND OF THE INVENTION

1. Field of the Invention

This invention relates to a dynamometer road simulating method and system for operating an automobile or a driving means thereof under a reproduced road load.

2. Description of the Prior Art

Dynamometer road simulation systems have already been proposed which can operate an automobile, a drive means thereof, or any other suitable machine to be tested under a reproduced road load. The road load is reproduced by controlling the dymanometer coupled to the test machine to produce an absorbing load corresponding to the road load minus the load loss resulting from friction and air resistances. One difficulty with such conventional systems is that troublesome and time-consuming operations are required to determine the load loss.

The present invention provides a dynamometer road simulating method and system which can operate a test machine under a reproduced road load without the need for any load loss determination.

SUMMARY OF THE INVENTION

According to the present invention, there is provided a method of operating a test machine under a reproduced road load by using a dynamometer having its rotary portion coupled to the test machine. Means are used storing the same moment of inertia for the dynamometer rotary portion as that of the test machine. The method comprises the steps of storing speed values in relation to corresponding times at which the test machine runs at the respective speed values while the test machine is coasting, controlling the speed of rotation of the dynamometer rotary portion to the stored speed values at the corresponding times, storing load values in relation to corresponding speeds at which the respective load values appear on the dynamometer rotary portion during the dynamometer speed control operation, and controlling the load produced on the dynamometer rotary shaft to meet the stored load values according to the speed of running of the test machine. The stored speed values may be obtained by measurement, at a constant time interval while the test vehicle is coasting under actual running conditions or by theoretical calculation.

The present invention also provides a road simulation system having a dynamometer with its rotary portion coupled to a test machine, and means for providing the same moment of inertia for the dynamometer rotary portion as that of the test machine. The system comprises first memory means for storing speed values in relation to corresponding times at which the test machine runs at the respective speed values while the test machine is coasting, and speed control means for controlling the speed of rotation of the dynamometer rotary portion to meet a target speed. The stored speed values are read out of the first memory means and fed as target speed values to the speed control means at the corresponding times. The system also comprises second memory means for storing load values in relation to corresponding speeds at which the respective load values appear on the dynamometer rotary portion while the speed values are read out of the first memory means. Load control means are provided for controlling the load produced on the dynamometer rotary shaft to meet a target load value. The stored load values are read out of the second memory means according to the speed of the test machine. The read load values are fed as target load values to the load control means.

BRIEF DESCRIPTION OF THE DRAWINGS

The details as well as other features and advantages of this invention are set forth below and are shown in the accompanying drawings, in which like reference numerals refer to the same or corresponding parts, and wherein.

DESCRIPTION OF THE PREFERRED EMBODIMENTS

Figure 1:
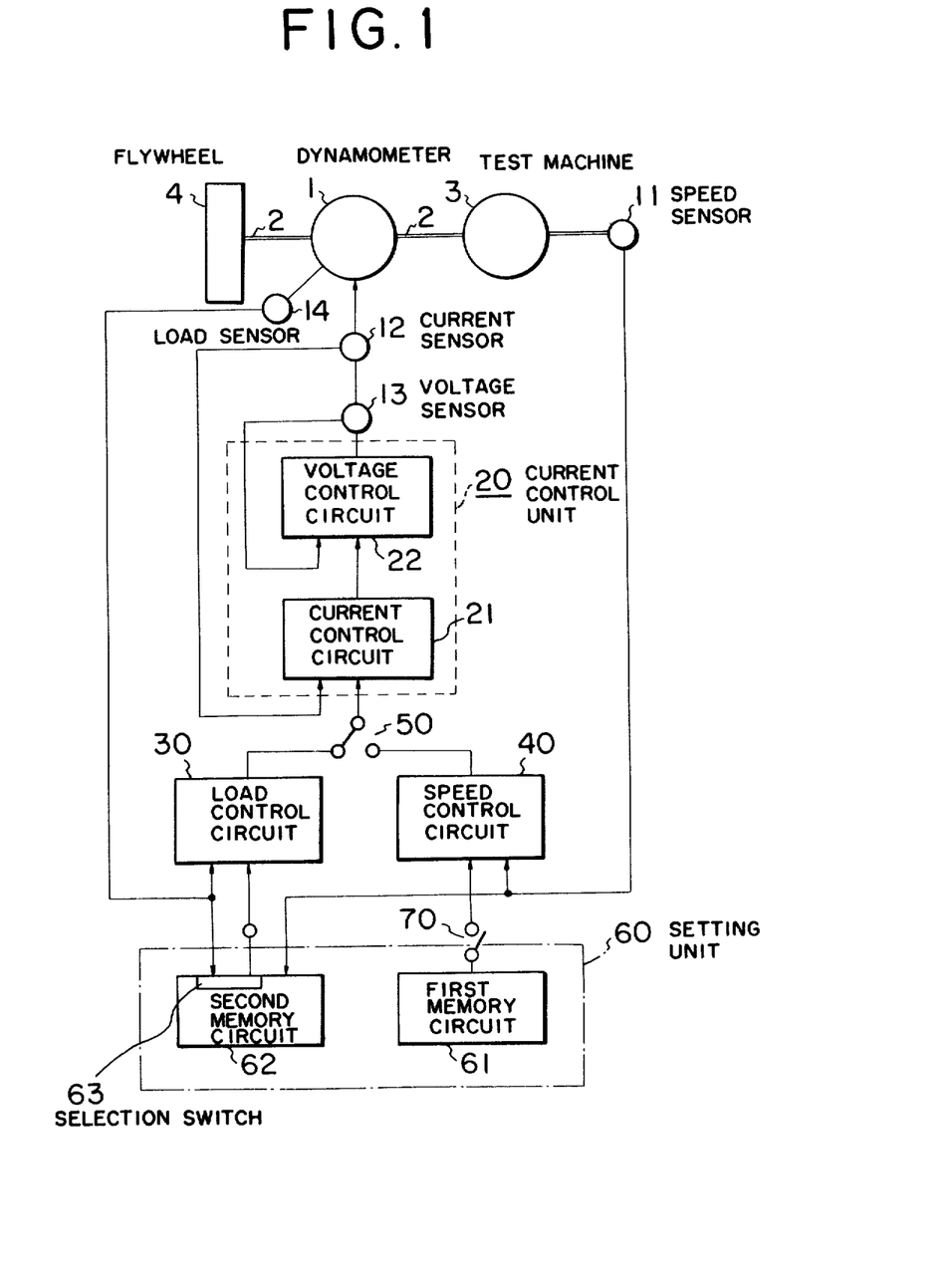
FIG. 1 is a block diagram showing one embodiment of a dynamometer road simulation system constructed in accordance with the present invention.

Referring first to FIG. 1, there is illustrated one embodiment of a dynamometer road simulation system constructed in accordance with the present invention. The system comprises a dynamometer 1 having a rotary shaft 2 connected to a machine 3 to be tested. It will be appreciated that the term "dynamometer" as used here is intended to mean any dynamometers including engine dynamometers wherein the test machine 3 comprises an engine, and chassis dynamometers wherein the test machine 3 comprises a test platform chassis carrying thereon a complete automobile. In addition, it is to be noted that the dynamometer 1 may be of the direct current type which provides an output load according to armature current or the eddy current type which provides and output load according to field current.

The mass of the rotary portion of the dynamometer 1 is usually smaller than the mass, or the inertia, of an actual automobile under loaded conditions. It is a common practice to provide means on the dynamometer shaft 2 for compensating the inertia difference. The inertia compensating means may be in the form of a flywheel 4 which is suitably selected to provide the same moment of inertia for the dymamometer 1 as that of the actual running automobile.

The dynamometer road simulating system also comprises various sensors such as a speed sensor 11, a current sensor 12, a voltage sensor 13, and a load sensor 14. The speed sensor 11 provides a signal having a voltage or frequency corresponding to the speed of rotation of the dynamometer shaft 2. The current sensor 12 provides a voltage signal proportional to the dynamometer current; i.e., the current through the armature if the dyamometer is of the direct current type or the current through the field winding if the dyamometer is of the eddy current type. The voltage sensor 13 provides a signal proportional to the dynamometer voltage; i.e., the voltage across the armature if the dynamometer is of the direct current type or the voltage across the field winding if the dynamometer is of the eddy current type. The load sensor 14 provides a voltage signal corresponding to the reaction or torque applied to a pendulum of the dynamometer 1.

The current sensor 12 is included in a current control feedback loop for controlling the dynamometer current to meet a target current value. The current control feedback loop also includes a current control unit 20 which comprises a current control circuit 21 and a voltage control circuit 22. The current control circuit 21 has an input from the current sensor 12 and a control input for receiving a signal representing a target current value. The current control circuit 21 compares the dynamometer current indicative signal with the target current indicative signal and provides a deviation signal representing the difference between the dynamometer current and the target current value. The deviation signal is fed from the current control circuit 21 to a control input of the voltage control circuit 22, the other input of which is coupled to the dynamometer voltage indicative signal from the voltage sensor 13. The voltage control circuit 22 compares the dynamometer voltage indicative signal with the deviation signal from the current control circuit 21 and provides a control signal representing the difference between the two inputs.

The load sensor 14 is included in a load control feedback loop for controlling the dynamometer load to meet a target value. The load control feedback loop includes a load control circuit 30 which has an input from the load sensor 14 and a control input for receiving a signal representing a target load value. The load control circuit 30 compares the dynamometer load indicative signal with the target load indicative signal and provides a deviation signal representing the difference between the two inputs. The output of the load control circuit is connected through a change-over switch 50 to the control input of the current control circuit 21.

The speed sensor 11 is included in a speed control feedback loop for controlling the dynamometer speed to meet a target value. The speed control feedback loop includes a speed control circuit 40 which has an input from the speed sensor 11 and a control input for receiving a signal representing a target speed value. The speed control circuit 40 compares the dynamometer speed indicative signal with the target speed indicative signal and provides a deviation signal representing the dynamometer speed and the target value. The output of the speed control circuit 40 is connected through the change-over switch 50 to the control input of the current control circuit 21.

Figure 2:
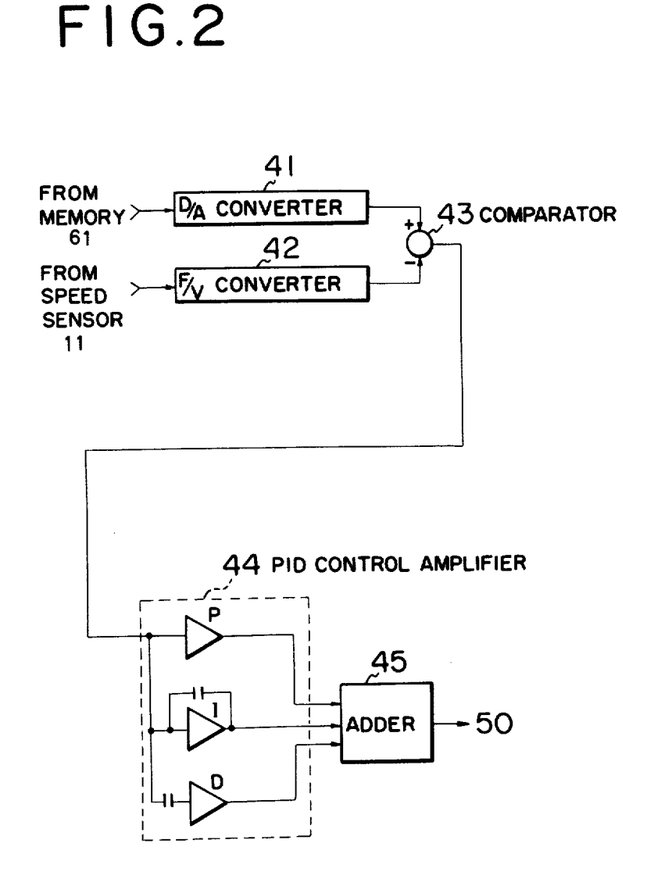
FIG. 2 is a diagram showing the speed control circuit included in the system of FIG. 1.

Referring to FIG. 2, the speed control circuit 40 is illustrated in more detail as including a D/A converter 41 for converting the target speed indicative signal from a first memory circuit 61 to be described later, into a corresponding analog voltage signal, and a frequency-to-voltage converter 42 for converting the dynamometer speed indicative signal from the speed sensor 11 into a corresponding analog voltage signal. A comparator 43 is provided which has inputs from the D/A converter 41 and the F/V converter 42. The comparator 43 compares the dynamometer speed indictive analog signal with the target speed indicative analog signal and provides a deviation signal representing the difference between the dynamometer speed and the target speed value. The output of the comparator 43 is fed through a PID control amplifier 44 to an adder 45 and hence through the change-over switch 50 to the control input of the current control circuit 21.

It is to be noted that the current control circuit 21 and the load control circuit 30 may be substantially similar in structure to the speed control circuit 40. In addition, the voltage control circuit 22 may be of the Ward Leonard type or the thyristor type as well known in the art.

Figure 3:
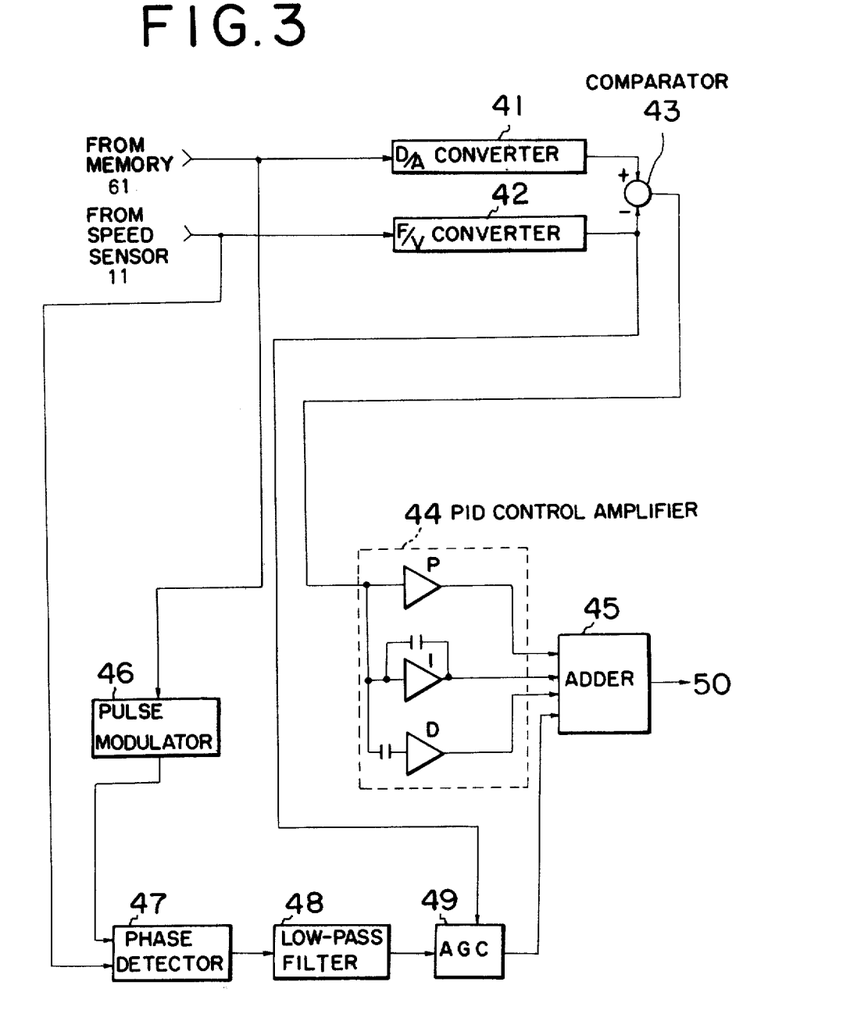
FIG. 3 is a diagram showing a modified form of the speed control circuit of FIG. 2.

FIG. 3 illustrates a modified form of the speed control circuit of FIG. 2. This modification is generally the same as shown in FIG. 2 except that a phase-locked loop is additionally provided for higher control accuracy. The phase-locked loop includes a pulse modulator 46, which may comprise a pulse oscillator and a rate multiplier. The pulse modulator 46 has an input from the first memory circuit 61 to be described later, for providing a pulse signal with a frequency which is proportional to the output of the first memory circuit. The output of the pulse modulator 46 is applied to one input of a phase detector 47, the other input of which is connected to the output of the speed sensor 11. The phase detector 47 provides a voltage signal corresponding to the difference in phase between the pulse signals from the pulse modulator 46 and the speed sensor 11. The output of the phase detector 47 is fed through a low-pass filter 48 to an automatic gain control circuit (AGC) 49 which provides a voltage signal with its magnitude adjusted according to the output of the F/V converter 42. The output of the automatic gain control circuit 49 is applied to the adder 45 so that the target value indicative signal from the first memory circuit 61 and the dynamometer speed indicative signal from the speed sensor 11 can be held in phase.

Referring back to FIG. 1, the dynamometer road simulation system also comprises a target value setting unit 60 which includes first and second memory circuit 61 and 62. The first memory circuit 61 stores speed values in connection with time and provides them sequentially to the control input of the speed control circuit 40 through a switch 70. The second memory circuit 62 stores target load values in connection with speed and provides them sequentially to the control input of the load control circuit 30.

Figure 4:
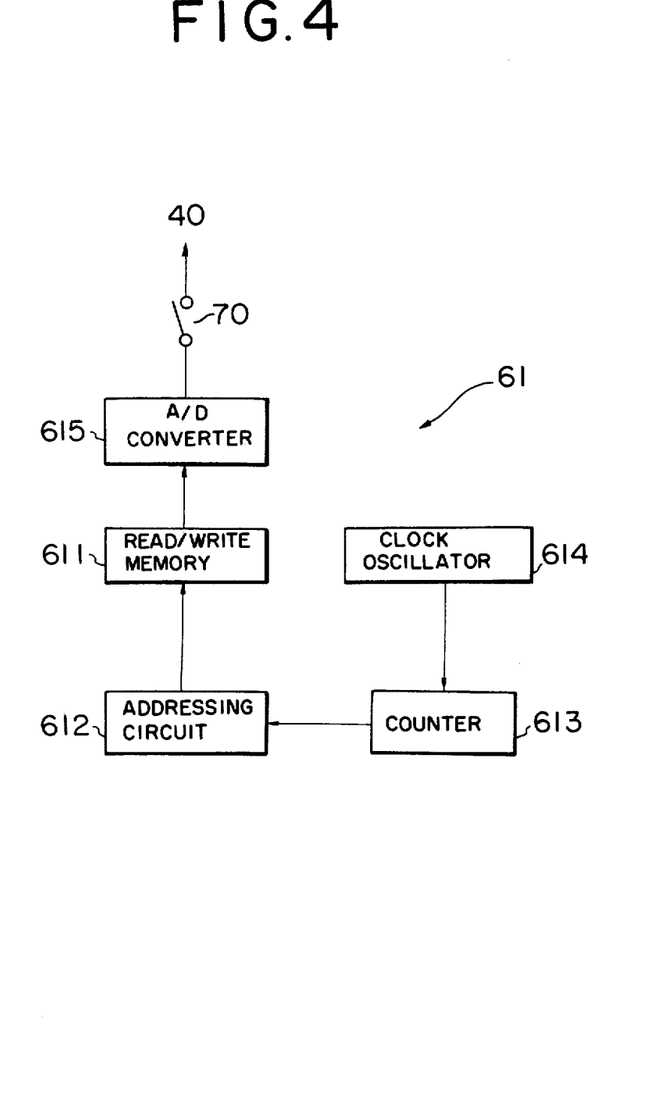
FIG. 4 is a block diagram showing the first memory circuit of the system of FIG. 1.

As shown in FIG. 4, the first memory circuit 61 comprises a read/write memory 611 for storing coasting speed values in respective address locations specified by the corresponding time values. The read/write memory 611 may be one sold under the trade name Intel 2102. An addressing circuit 612 is provided which has an input from a counter 613 for counting the number of clock pulses from a clock oscillator 614. Each time the counter 613 counts to a predetermined value, the addressing circuit 612 provides an address signal to the read/write memory 611 and reads a coasting speed value out of the address location specified by the address signal. The read coasting speed value is fed to an A/D coverter 615 where it is converted into a corresponding analog value. The converted analog value is applied as a target speed value to the control input of the speed control circuit 40 through the switch 70. That is, target speed values are sequentially applied to the speed control circuit 40 at constant timed intervals after the switch 70 is closed.

It is to be noted that the first memory circuit 61 is not limited to the arrangement as described above. Alternatively, the first memory circuit 61 may comprise another memory means taken in the form of the combination of a potentiometer and a digital switch for setting coasting speed values in connection with the corresponding time values. In this case, the stored data may be outputted through a function generator adapted to generate a signal representing a curve passing the respective set coasting speed values in response to a time indicative signal.

Figure 5:
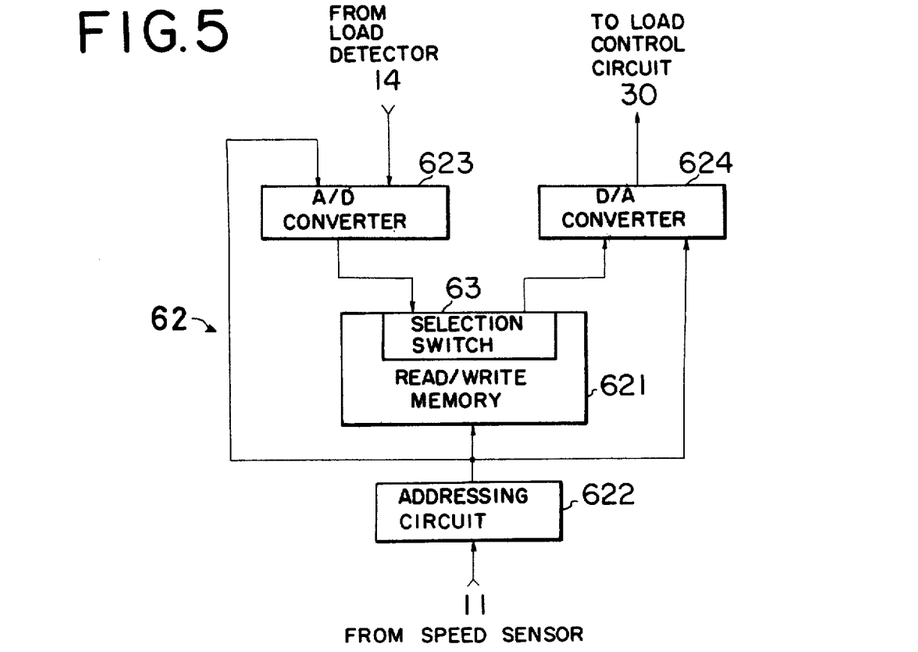
FIG. 5 is a block diagram showing the second memory circuit of the system fo FIG. 1.

FIG. 5 illustrates in more detail, the second memory circit 62 which includes a read/write memory 621 for storing dynamometer load values in respective address locations specified by the corresponding coasting speed values. The read/write memory 621 may be one sold under the trade name Intel 2101. An addressing circuit 622 is provided which includes a calculator having bits numbered according to the number of address locations of the read/write memory 621 for calculating the reciprocal of the pulse period of the speed indicative signal from the speed sensor 11. The addressing circuit 622 provides an address signal representing the calculated reciprocal to the read/write memory 612, the other input of which is connected to the load sensor 14. The A/D converter 623 converts the load indicative signal from the load sensor 14 into a corresponding digital signal each time an address signal is applied thereto from the addressing circuit 622. The converted digital signal is applied through a selection switch 63 to the read/write memory 621 which stores it in the address location specified by the address signal from the addressing circuit 622.

The second memory circuit 62 also includes a D/A converter 624, one input of which is connected to the output of the addressing circuit 622 and the other input being connected through the selection switch 63 to the output of the read/write memory 621, Each time an address signal is applied thereto from the addressing circuit 622, the D/A converter 624 converts the load value stored in the address location specified by the address signal into a corresponding analog signal. The converted analog signal, which represents a target load value, is fed to the control input of the load control circuit 30 so that the dynamometer load can be controlled to meet the target value. The selection switch 63 may comprise a logic circuit associated with the change-over switch 50. The selection switch 63 is in its "write" position connecting the A/D coverter 623 to the read/write memory 621 and disconnecting the read/write memory 621 from the D/A converter 624 only when the change-over switch 50 is connected to the speed control circuit 40. The selection switch 63 is in its "read" position connecting the read/write memory 621 to the D/A converter 624 when the change-over switch 50 is connected to the load control circuit 30.

It is to be noted that the second memory circuit 62 may be used with a speed sensor adapted to provide an analog voltage signal proportional to the dynamometer speed by replacing the addressing circuit 622 with an A/D converter having bits numbered according to the number of the addresss locations of the read/write memory 621.

Figure 6:
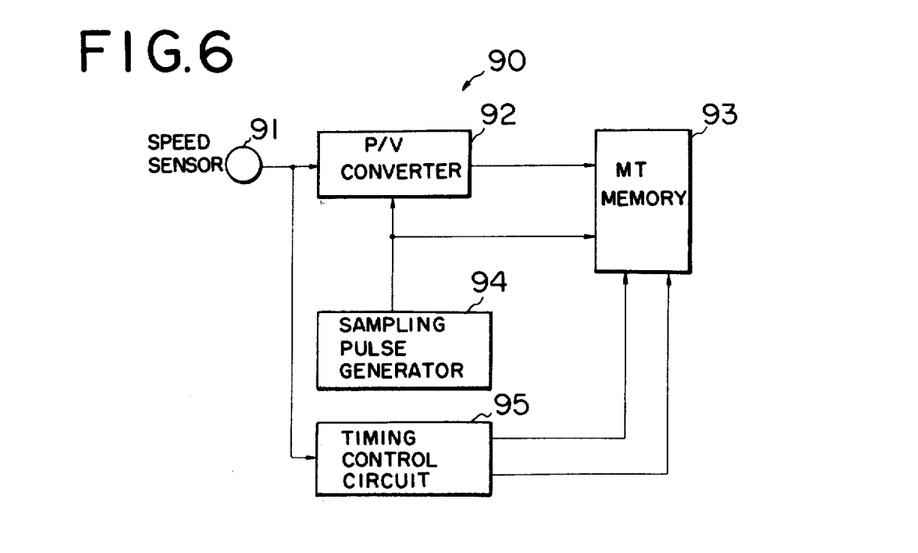
FIG. 6 is a block diagram showing a recorder installed on a test vehicle for recroding speed values measured while the test vehicle is coasting under actual running conditions.

Referring to FIG. 6, there is illustrated a recorder 90 which may be installed on a test vehicle for recording a number of speed values measured at constant time intervals while the test vehicle is coasting under actual running conditions. The road test record is obtained from a test vehicle similar to the type of vehicle to be tested by means of an actual road test. The actual road test is conducted a desired number of times by driving the vehicle over a predetermined road course and by recording the speed and corresponding time while the vehicle is coasting after the driver increases the vehicle speed to a predetermined time and changes the transmission gear into its neutral position.

The recorder 90 comprises a speed sensor 91 adapted to provide a pulse signal having a pulse period proportional to the speed of the vehicle, and a sampling pulse oscillator 94 adapted to provide sampling pulses at a predetermined time interval, for example, of 0.1 sec. The pulse signal from the speed sensor 91 is fed to a period-to-voltage converter 92 which converts it into a voltage signal proportional to the vehicle speed each time a sampling pulse is applied thereto from the sampling pulse oscillator 94. Sumultaneously, the speed indicative signal is stored in a magnetic tape memory 93 in synchronism with the occurrence of the sampling pulse. A timing control circuit 95 is provided which compares the vehicle speed indicative signal from the speed sensor 91 with first and second reference values corresponding to predetermined upper and lower limit engine speed values. The timing control circuits 95 provides an ON signal to the magnetic tape memory 93 which thereby starts recording the vehicle speed values when the vehicle speed reaches the upper limit value. The timing control circuit 95 provides an OFF signal to terminate the recording operation of the magnetic tape memory 93 when the vehicle speed reaches the lower limit value.

The records obtained during repeated actual road tests are transferred into a computer memory. The computer removes abnormal data from the records, prepares averaged speed-versus-time data, and corrects them based upon weather and other conditions. The corrected data are written into the read/write memory 611 of the first memory circuit 61. The written data comprises coasting speed values in respective address locations specified by the corresponding time.

While the read/write memory 611 of the first memory circuit 61 has been described as storing the recorded data obtained during actual road tests, it is to be noted that the memory 611 may be designed to store the data obtained by calculating coasting speed values from the following theoretical equation:

$$F = A + BV + CV^2 = \frac{W}{g} \cdot \frac{dV}{dt} \tag{1}$$

where F is the road load, V is the vehicle speed, W/g is the inertia mass of the rotating portion of the dynamometer system, t is the lapse time, and A, B and C are constants determined by the vehicle type, road conditions and other factors.

The relationship between the coasting speed V and the lapse time t is obtained by solving equation (1) as follows:

$$V = C1 \cdot \tan(C2 - C3 \cdot t) + C4$$

where C1 to C4 are constants determined by the values of A, B, C and W/g in equation (1).

The dynamometer 1 is controlled as follows:

First of all, the transmission gear of a vehicle used as a test machine, is shifted into its neutral position to disconnect the vehicle wheel from the engine speed. After the change-over switch 50 is changed over into connection with the speed control circuit 40 to establish the speed control feedback loop, the dynamometer speed is increased to the upper limit value predetermined upon the actual road test. This may be accomplished by using a separate motor to rotate the dynamometer to the upper limit speed or by driving the test machine 3 and changing the transmission gear into its neutral position when the dynamometer speed reaches the upper limit value if the dynamometer 1 of the eddy current type is used. If the dynamometer 1 is of the direct current type, a reference voltage generator (not shown) may be used to apply a voltage corresponding to the upper limit speed value to the control input of the speed control circuit 40.

Following this, the switch 70 is closed to connect the output of the first memory circuit 61 to the control input of the speed control circuit 40. As a result, with the a lapse of time, speed values are sequentially read out of the respective address locations of the read/write memory and converted into corresponding analog signals which represent the coasting speed values obtained in connection with time while the test vehicle is coasting under actual running conditions. The converted analog signals are applied as target speed values to the control input of the speed control circuit 40 so that the dynamometer speed can be controlled through the speed control feedback loop to the respective target speed values with the lapse of time. That is, the speed of the vehicle wheel coupled to the dynamometer shaft 2 decreases from the upper limit value at the same rate as obtained while the test vehicle is coasting under actual running conditions. During this speed control operation, the vehicle wheel is subject to a load corresponding to the road load exerted on the test vehicle under actual running conditions since the moment of inertia of the dynamometer 1 is the same as that of the actual running vehicle. In other words, the dynamometer 1 itself produces a load corresponding to the road load minus the load loss resulting from friction and air resistances.

In this state of the circuit, the selection switch 63, which is associated with the change-over switch 50, is changed over into its "write" position during the dynamometer speed control operation. Consequently, each time the addressing circuit 622 of the second memory circuit 62, which receives the output of the speed sensor 11, provides an address signal corresponding to the dynamometer speed to the A/D converter 623 and also to the read/write memory 621, the A/D converter converts the output of the load sensor 14 into a corresponding dynamometer load indicative digital signal and the read/write memory stores the converted signal in the address location specified by the address signal. Accordingly, the read/write memory 621 of the second memory circuit 62 stores load values produced by the dynamometer 1 in respective locations addressed by the corresponding speed values. It will be understood that the data stored in the read/write memory 621 are load values, which correspond to the road load minus the load loss, relative to the corresponding dynamometer speed values.

To control the dynamometer 1 so as to apply the same absorbing load as the road load to the test machine 3 driven at a desired speed after the transmission gear is shifted from the neutral position into a given position, the change-over switch 50 may be changed over into connection with the load control circuit 30 to make the load control feedback loop. This also changes the selection switch 63 into its "read" position. As a result, a load value is read out of the address location of the read/write memory 621 corresponding to the speed of the vehicle wheel sensed by the speed sensor 11 and is fed to the D/A converter 624 where it is converted into a corresponding load indicative analog signal. The converted signal is applied to the control input of the load control circuit 30 so that the dynamometer load can be controlled to a value represented by the load value read out of the second memory circuit 62 according to the speed at which the vehicle wheel rotates. That is, the dynamometer 1 produces a load corresponding to the road load minus the load loss. Accordingly, the test machine 3 is subjected to a load corresponding to the road load.

Figure 7:
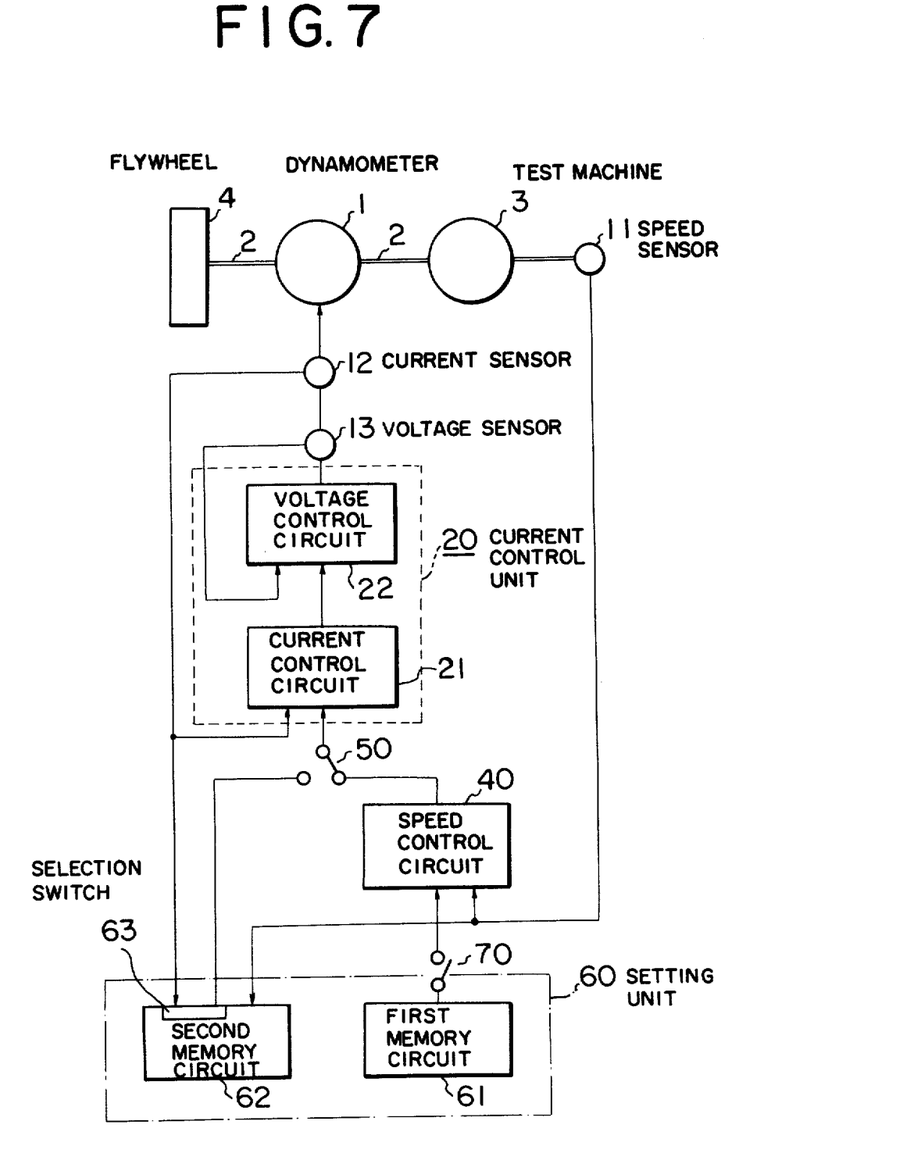
FIG. 7 is a block diagram showing the second embodiment of the present invention.

Referring to FIG. 7, there is illustrated a second embodiment of the present invention. The chief difference between FIG. 7 and the first described embodiment is that the load sensor 14 and the load control circuit 30 are removed. Parts in FIG. 7 which are like those in FIG. 1 have been given the same reference numeral. This embodiment is advantageous in maintaining a high control accuracy over a long period of time since the accuracy of the load sensor becomes degraded after a long use. In the embodiment, the second memory circuit 62 has an input through the selection switch 63 from the current sensor 12. The output of the second memory circuit 62 has an input through the selection switch 63 from the current sensor 12. The output of the second memory circuit 62 is coupled through the selection switch 63 and the change-over switch 50 to the control input of the current control circuit 21.

The speed control operation of the system of FIG. 7 is substantially similar to that described in connection with the first embodiment except that each time the addressing circuit 622 of the second memory circuit 62 provides an address signal corresponding to the dynamometer speed to the A/D converter 623 and also to the read/write memory 621, the A/D converter 623 converts the output of the current sensor 12 into a corresponding dynamometer current indicative digital signal and the read/write memory stores the converted signal in the address location specified by the address signal. Accordingly, the read/write memory 621 stores current values sensed by the current sensor 12 in respective locations addressed by the corresponding speed values. That is, the data stored in the read/write memory 621 are current values, which cause the dynamometer 1 to produce a load corresponding the road load minus the load loss, relative to the corresponding dynamometer speed values.

To control the dynamometer 1 so as to apply the same absorbing load as the road load to the test machine 3 driven at a desired speed after the transmission gear is shifted from the neutral position into a given position, the change-over switch 50 may be changed over into connection with the second memory circuit 62. This also changes the selection switch 63 into its "read" position to connect the second memory circuit 62 to the control input of the current control circuit 21. As a result, a current value is read out of the address location of the read/write memory 621 corresponding to the speed of the vehicle wheel sensed by the speed sensor 11 and is fed to the D/A converter 624 where it is converted into a corresponding current indicative analog signal. The converted signal is applied to the control input of the current control circuit 21 so that the dynamometer current can be controlled to a value represented by the current value read out of the second memory circuit 62 according to the speed at which the vehicle wheel rotates. Accordingly, the dynamometer 1 produces a load corresponding to the road load minus the load loss. That is, the test machine 3 is subjected to a load corresponding the road load.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A method of operating a test vehicle under a reproduced road load by using a dynamometer having the same inertia moment as that of said test vehicle, said test vehicle having a vehicle wheel drivingly associated with said dynamometer and connected through a transmission gear unit to a vehicle engine, said method comprising the steps of:
    (a) storing road test data having decreasing values of vehicle speed in relation to corresponding values of elapsed time while coasting said vehicle under actual running conditions after the vehicle speed has been increased to a predetermined value, the vehicle being driven along a predetermined road course;
    (b) with the vehicle connected to the dynamometer and said vehicle wheel disconnected from said vehicle engine, controlling the speed of rotation of said dynamometer in accordance with the decreasing speed values in said road test data after the dynamometer has been driven to a speed at least equal to a speed corresponding to said predetermined value;
    (c) during step (b), storing simulation data having values of the load exerted on said dynamometer in relation to values of corresponding speed of rotation of said dynamometer; and
    (d) with the vehicle connected to the dynamometer and said vehicle wheel driven by said vehicle engine, simulating a road test by detecting the speed of rotation of said dynamometer and controlling the load of said dynamometer in accordance with the corresponding load values in said simulation data.

2. A method of operating a test vehicle under a reproduced road load by using a direct current or eddy current dynamometer having the same inertia moment as that of said test vehicle, said test vehicle having a vehicle wheel drivingly associated with said dynamometer and connected through a transmission gear unit to a vehicle engine, said method comprising the steps of:
    (a) storing road test data having decreasing values of vehicle speed in relation to corresponding values of elapsed time while coasting said vehicle under actual running conditions after the vehicle speed has been increased to a predetermined value, the vehicle being driven along a predetermined road course;
    (b) with the vehicle connected to the dynamometer and said vehicle wheel disconnected from said vehicle engine, controlling the speed of rotation of said dynamometer in accordance with the decreasing speed values in said road test data after the dynamometer has been driven to a speed at least equal to a speed corresponding to said predetermined value;
    (c) during step (b), storing simulation data having values of a current flow through said dynamometer in relation to values of corresponding speed of said dynamometer; and
    (d) with the vehicle connected to the dynamometer and said vehicle wheel driven by said vehicle engine, simulating a road test by detecting the speed of rotation of said dynamometer and controlling the load of said dynamometer in accordance with the corresponding current flow values in said simulation data.

* * * * *